United States Patent [19]

Miller et al.

[11] Patent Number: 5,374,356
[45] Date of Patent: Dec. 20, 1994

[54] FLUID TREATMENT PROCESS USING DYNAMIC MICROFILTRATION AND ULTRAFILTRATION

[75] Inventors: John D. Miller, Ithaca; P. Glenn Barkley, Cortland; Donald H. White, Jr., Homer; Dana E. Gingrich, Homer, all of N.Y.

[73] Assignee: Pall Corporation, East Hills, N.Y.

[21] Appl. No.: 920,973

[22] Filed: Jul. 28, 1992

[51] Int. Cl.$^5$ .............................................. B01D 61/20
[52] U.S. Cl. ................................... 210/641; 210/651; 210/259
[58] Field of Search ............... 210/641, 651, 652, 259, 210/258, 625

[56] References Cited

U.S. PATENT DOCUMENTS

| | | |
|---|---|---|
| 3,337,454 | 8/1967 | Gruenwald . |
| 4,081,365 | 3/1978 | White et al. . |
| 4,116,828 | 9/1978 | Sawyer, Jr. . |
| 4,238,334 | 12/1980 | Halbfoster . |
| 4,517,095 | 5/1985 | Ceaser . |
| 4,661,256 | 4/1987 | Johnson . |
| 4,725,361 | 2/1988 | Fleming . |
| 4,765,906 | 8/1988 | Downing et al. ................ 210/651 X |
| 4,795,735 | 1/1989 | Liu et al. . |
| 4,849,095 | 7/1989 | Johnson et al. . |
| 4,864,012 | 9/1989 | Britt . |
| 4,923,843 | 5/1990 | Saforo et al. . |
| 5,143,630 | 9/1992 | Rolchigo ............................ 210/780 |

FOREIGN PATENT DOCUMENTS

WO 91/14603 10/1993 WIPO .

OTHER PUBLICATIONS

Bhattacharyya et al., "Ultrafiltration of Laundry Waste Constituents," *J. WPCF*, 46(10), 2372–86 (Oct. 1974).
Brandon et al., "Complete Reuse of Textile Dyeing Wastes Processed with Dynamic Membrane Hyperfiltration," *J. Am. Assoc. Textile Chemists & Colorists*, 5(7), 134–37 (Jul. 1973).
Brandon et al., "Hyperfiltration Pilot Plant for Textile Wastewater Renovation," *Am. Dyestuff Reporter*, 20–41 (Oct. 1975).
Breck, "Crystalline Molecular Sieves," *J. Chemical Education*, 48, 678–689 (Dec. 1964).
Chiang et al., "Ultrafiltration and Reverse Osmosis of the Waste Water from Sweet Potato Starch Process," *J. Food Science*, 51(4), 971–974 (1986).
Eriksson, "Nanofiltration Extends the Range of Membrane Filtration," *Environmental Progress*, 7(1), 58–62 (Feb. 1988).
Grieves et al., "Membrane Ultrafiltration to Treat Laundry Wastes and Shower Wastes for Water Reuse," Society of Automotive Engineers Intersociety Conference on Environmental Systems (Seattle, Jul. 29–Aug. 1, 1974).
Minturn et al., "Hyperfiltration of Laundry Wastes," *Water Research*, 8, 921–926 (1974).
Murkes, "Fundamentals of Crossflow Filtration," *Separation & Purification Methods*, 19(1), 1–29 (1990).
Neely et al., *Carbonaceous Adsorbents for the Treatment of Ground and Surface Waters*, pp. 8–11 (Marcel Dekker, Inc., New York and Basel, 1982).
Rautenbach et al., "Separation Potential of Nanofiltration Membranes," *Desalination*, 77, 73–84 (1990).
Ryder et al., "Brewing Experience with Cross-Flow Filtration", *MBAA Technical Quarterly*, 25, 67–79 (1988).

(List continued on next page.)

*Primary Examiner*—Frank Spear
*Attorney, Agent, or Firm*—Leydig, Voit & Mayer, Ltd.

[57] ABSTRACT

A method of treating wastewater by passing wastewater into a dynamic microfiltration assembly to form a first concentrate stream and a filtrate stream and then passing the filtrate steam into an ultrafiltration assembly to form a second concentrate stream and a purified water stream.

25 Claims, 1 Drawing Sheet

OTHER PUBLICATIONS

Sammon et al., "The Application of Membrane Processes in the Treatment of Sewage," *Process Biochemistry*, 4–12 (Mar. 1975).

Tur et al., "Nanofiltration Motivates Future Wastewater Reclamation," *45th Purdue Industrial Waste Conference Proceedings*, 557–562 (Chelsea, Mich. 1991).

Waterbury, "Treatment Tames Bakery Effluents," *Intech*, 50 (Oct. 1991).

Wentz et al., "Treatment of Commercial Laundry Wastewaters," *AATCC Book of Papers Annual*, 413–421 (1974).

White, "Regenerable Pressure-Swing Adsorption Systems for Continuous Chemical Warfare Collective Protection," presented at the Naval Research Lab, Washington, D.C. (Apr. 23, 1986).

"The A–B–Seas of Desalting," U.S. Department of the Interior, Office of Saline Water, U.S. Government Printing Office, Washington, D.C. (1968).

FLUID TREATMENT PROCESS USING DYNAMIC MICROFILTRATION AND ULTRAFILTRATION

TECHNICAL FIELD OF THE INVENTION

The present invention relates to a fluid treatment process. More particularly, the present invention relates to an improved method for treating wastewater, particularly graywater, to recover purified water and reduce effluents by dynamic microfiltration and ultrafiltration and to an apparatus for effecting such wastewater treatment.

BACKGROUND OF THE INVENTION

The treatment of wastewater to reduce effluents and recycle usable water is a matter of the utmost importance to the overall effort of reducing pollution and conserving water. A particular area of concern is the handling of graywater aboard ships and boats. Graywater is defined as the combined effluent wastewaters from shipboard galleys, sculleries, dishwashers, laundries, showers, sinks, and wash basins (including deep sinks in work areas such as machine shops and medical areas). The contaminants are typically food particles of up to substantial dimensions (e.g., food slices), animal fats, vegetable oils, soaps, detergents, body oils, human hairs, metallic particles from sculleries and machine shops, solvents, and small articles of clothing (e.g., socks) which may have snaked their way through the laundry system. Graywater is usually differentiated both from blackwater, which is a salt-water-based collection of body wastes and paper materials from shipboard head spaces, and from bilgewater, which is a salt-water-based accumulation of all other shipboard wastewater and which may contain chemical solvents and the like.

Although highly variable in its rate of generation, as well as the concentration and type of contaminants, graywater is generated at an average rate of approximately 15–20 gallons per man per day on board ship. Thus, for example, graywater generation can be on the order of 4,000 gal/day for a naval frigate with a crew of 200 to as high as 120,000 gal/day for an aircraft carrier with a crew of 6,000. Average flow rates of graywater on board such ships can range from about 2.8 gal/min to about 83.3 gal/min, with peak flow rates ranging from about 8.4 gal/min to about 250 gal/min.

Conventional coalescers and centrifugal separators are inadequate to treat and purify graywater, since, for example, the viscosities and surface tensions of soaps and water are too close to permit satisfactory separation. Many ships directly discharge graywater, without treatment, into navigable waters, including lakes and waters near the shoreline. Some ships are equipped with concentration, holding, and transfer tanks for the purpose of storing graywater until it can be pumped to a dockside sanitation system. These ships utilize the concentration, holding, and transfer tanks in an attempt to avoid graywater discharges into lakes and waters near the shoreline, but routinely discharge graywater into the high seas or, when the tanks are filled to capacity, other navigable waters. In those increasingly larger areas where graywater discharge is prohibited, expensive and cumbersome means, such as the off-loading of stored graywater onto tankers, are utilized, or else the prohibitions are merely ignored.

There remains a need, therefore, for an effective and economical means to reduce wastewater effluent, particularly graywater discharges from ships. It is an object of the present invention to provide such a treatment means. It is another object of the present invention to concentrate wastewater contaminants to render them more amenable to storage and disposal while allowing for the discharge of purified water recovered from the wastewater. It is also an object of the present invention to provide a means of treating wastewater, particularly graywater, so as to recycle usable water and thereby conserve water.

These and other objects and advantages of the present invention, as well as additional inventive features, will be apparent from the description of the invention provided herein.

BRIEF SUMMARY OF THE INVENTION

The present invention concerns a method of treating wastewater comprising passing wastewater into a dynamic microfiltration assembly to form a first concentrate stream and a filtrate stream and then passing the resulting filtrate steam into an ultrafiltration assembly to form a second concentrate stream and a purified water stream. The present invention also contemplates an apparatus for effecting such a wastewater treatment process.

DESCRIPTION OF THE PREFERRED EMBODIMENT

Figure 1:
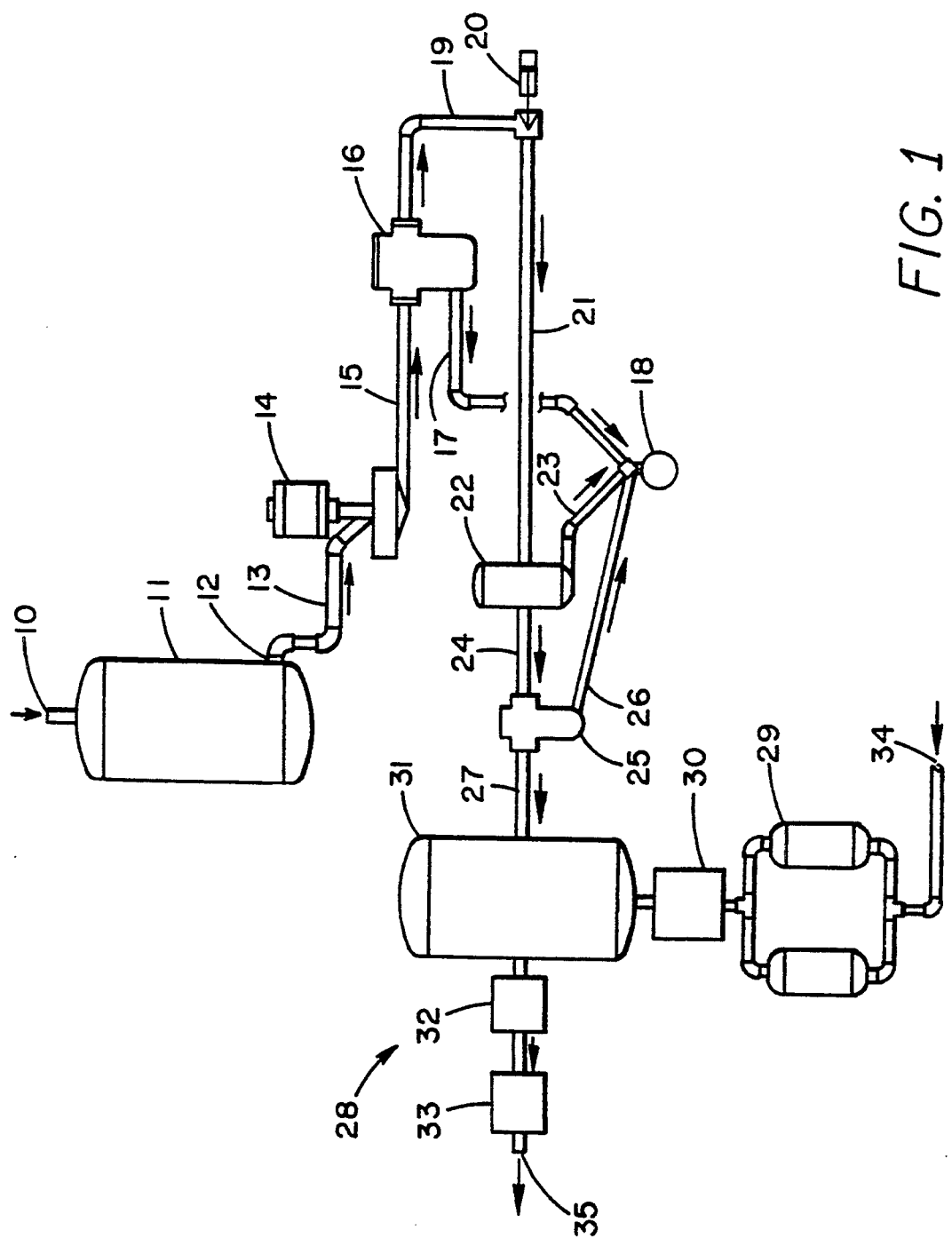
FIG. 1 is a schematic view of a preferred system for treating graywater on board ship in accordance with the present invention.

The present invention is premised on the discovery that wastewater can be treated to concentrate contaminants in the wastewater and provide a purified water stream by passing the wastewater into a dynamic microfiltration assembly to form a first concentrate stream and a filtrate stream and then passing the filtrate steam into an ultrafiltration assembly to form a second concentrate stream and a purified water stream. The purified water stream can then be further treated, recycled, and/or discharged as appropriate. The first and second concentrate streams can be further processed or held for proper disposal.

While the present invention is particularly well-suited for the treatment of graywater, the present inventive treatment process may be used to treat other types of wastewater. Other suitable uses of the present invention include the treatment of wastewater from food processing plants such as breweries, bakeries, sweet potato starch processing plants, and poultry processing plants, laundries, textile plants, and the like. The present invention is described herein in the context of the treatment of graywater on board ships, although it will be understood that it is well within the skill of an ordinary artisan to apply the present invention in other contexts.

The function of the present invention as applied to the treatment of graywater generated on board a ship is to reduce the quantity and/or concentrations of various contaminants to levels below the standards set for receiving waters, i.e., those natural waters into which the graywater may be discharged by a ship. The typical characteristics of graywater and receiving water are set forth below.

| Characteristic | Graywater | Receiving Water |
| --- | --- | --- |
| Total Solids (TS) (mg/l) | 259–11700 | 30–11600 |
| Total Suspended Solids (TSS) (mg/l) | 101–4695 | 30 |
| Biochemical oxygen Demand (BOD) (mg/l) | 137–2616 | 30 |
| Chemical Oxygen Demand (COD) (mg/l) | 304–7839 | 0–90 |
| Oils & Greases (O&G) (mg/l) | 5–1210 | 0–15 |
| Fecal Coliforms (FC) (#/100 ml) | 0–10$^4$ | 14 |
| pH | 5.7–11.2 | 6.5–8.5 |
| Residual chlorine (RC) (mg/l) | 0–10 | 0.0002 |
| Dissolved Oxygen (DO) (mg/l) | 0 | $\geq 5$ |

The total solids (TS) is the sum of the total suspended solids (TSS) and total dissolved solids. The total solids is the residue which would remain after evaporation. The biochemical oxygen demand (BOD) represents the quantity of dissolved oxygen required during stabilization of the decomposable organic matter by aerobic biochemical action in the water. The chemical oxygen demand (COD) is a measure of the quantity of oxidizable components present in the water.

The treatment of graywater in accordance with the present invention involves the successive separation of smaller particles from the graywater stream. While the dynamic microfiltration assembly and the ultrafiltration assembly, in tandem, effectively remove suspended particles from graywater, it will usually be desirable to pre-treat the graywater prior to dynamic microfiltration and to post-treat the effluent after ultrafiltration. The preferred embodiment of the present invention incorporates such pre- and post-treatments.

The present invention preferably treats graywater such that the treated graywater has less than about 30–11600 mg/l total solids, less than about 30 mg/l total suspended solids, less than about 30 mg/l BOD, less than about 90 mg/l COD, less than about 15 mg/l oils and greases, less than about 14 fecal coliforms/100 ml, less than about 0.0002 mg/l residual chlorine, and more than about 5 mg/l dissolved oxygen. The treated graywater also preferably has a pH of about 6.5 to about 8.5.

The present invention may best be understood with reference to the accompanying drawing wherein a preferred embodiment of the present invention is shown for effecting the treatment of graywater generated on board a ship.

As shown in FIG. 1, graywater from the various sources on board a ship is directed into the inlet 10 of a holding tank 11. The holding tank 11 is sized to collect and hold a volume equivalent to peak flow for some reasonable period of time, e.g., about an hour to several hours time, to ensure that the treatment system is not overwhelmed during times of excessive graywater generation (although the holding tank volume may be smaller or larger depending on the specific graywater generation and treatment system capacity). The holding tank outlet 12 is set a short distance, e.g., a several centimeters, above the bottom of the holding tank 11 to permit high density pieces entrained in the graywater to settle out on the bottom of the holding tank 11. The bottom of the holding tank 11 has a removable access cover to facilitate occasional periodic removal of the high density contaminants. The holding tank 11 also provides some equalization for the incoming graywater. The volume and contaminant concentration of the graywater will vary throughout the day, and, therefore, subsequent processing will produce more consistent results as the variations in flow rate and concentrations are averaged out or equalized by the holding tank. Such equalization will have a particular effect on possible excursions in the outlet BOD, pH, and other parameters.

The outlet 12 of the holding tank 11 is connected by way of fluid pathway 13 to a macerator pump 14. The macerator pump 14 draws graywater out of the holding tank 11, reduces solid materials to smaller particles, and furnishes the pressure to force the graywater through the remainder of the treatment system. The macerator pump 14 may be positioned outside the holding tank 11 (as shown) or within the holding tank 11 (not shown). The macerator pump 14 is fitted with an integral inlet screen. This pump inlet is set into the holding tank, permitting the debris collected on the screen to be backwashed as needed into the bottom of the holding tank 11 for subsequent removal. The inlet screen is preferably sized to reduce the frequency of clean-out while removing all particulates of sufficient size which would otherwise overwhelm the macerator pump.

The macerator pump 14 is connected by way of fluid pathway 15 to a duplex strainer 16. The duplex strainer 16 removes larger particles, e.g., those greater than about 90 μm to about 500 μm in diameter, preferably those greater than about 84 μm in diameter, from the graywater exiting the macerator pump 14 so as to protect the downstream dynamic microfiltration assembly 22. The duplex strainer is preferably sized to reduce the frequency of plugging while removing as much particulate matter as possible, particularly particulate matter which would disrupt the satisfactory operation of the dynamic microfiltration assembly. To permit continuous operation, a duplex switching strainer is used such that, as one strainer becomes plugged, it is taken off-line, and flow is switched to the second strainer. The off-line strainer is backwashed with a relatively small volume of strained graywater to clean the strainer for later use. This effluent is passed by way of fluid pathway 17 to a concentrate tank 18 for later disposal. The backwashing may be accomplished by any suitable means, e.g., automatically through the use of either clean water or air-pulse means, thereby eliminating operator intervention in this process.

The strained water from the duplex strainer 16 is passed through fluid pathway 19 to a point where chemicals can be fed into the graywater by way of chemical feed systems 20. Preferably, two chemical feed systems 20 are employed. The first chemical feed system is for acid feed to neutralize the graywater, and the second chemical feed system is to inject coagulant into the graywater to improve the separation efficiency of the dynamic microfiltration assembly 22. Each chemical feed system comprises a piston pump and an electronic controller. Sensors installed downstream send signals to the electronic controllers to automatically regulate the rate of chemical feed. The chemical feed pumps can be connected directly to the storage containers or carboys containing acid feed and coagulant by any suitable means, e.g., by way of flexible suction hoses.

After the point at which the chemical feed systems 20 can inject appropriate chemicals into the fluid pathway 19, the graywater is passed by way of fluid pathway 21 to the dynamic microfiltration assembly 22. The dynamic microfiltration assembly 22 is designed to concentrate and remove from the graywater those particles capable of adversely affecting subsequent ultrafiltration. The dynamic microfiltration assembly 22 preferably removes those particles with effective diameters in excess of approximately 1 $\mu$m in order to present a particle size distribution of very small mass median diameter, albeit high particle concentrations, to the downstream ultrafiltration assembly 25.

At this level of microfiltration in an efficient and practical graywater treatment system on board ship, it has been found that effective filtration can only be accomplished through the use of dynamic microfiltration. Specifically, the effective pore sizes of the filter media are so small, and the effective area of the filter media are so limited, that both plugging of the filter media pores and the formation of cake layers adjacent to the surface of the filter media present themselves as problems with the use of ordinary barrier-type filter elements.

For graywater treatment, once-through barrier filtration is not as satisfactory as dynamic microfiltration because the volumes and contaminant concentrations are too high for the effective use of once-through filters, an effective backflush system would be prohibitively large, and precoating (which is needed to keep compressible or sticky contaminants away from the filter medium) requires the introduction of additional chemicals which must be eventually disposed of with the concentrated waste. Similarly, cross-flow filtration is not as satisfactory as dynamic microfiltration because the cross-flow velocity is much greater than the permeation velocity, and the filter medium is thus subjected to progressive fouling, typically proceeding from the inlet end.

Dynamic microfiltration is an extension of the cross-flow filtration concept. The operating principle is to maintain a filter medium free from plugging or fouling by repelling particulate matter from the filter element and by disrupting the formation of cake layers adjacent to the filter medium. These results are accomplished by moving the filter medium fast enough relative to the fluid stream to produce high shear rates as well as high lift forces on the particles. Thus, the shear at the fluid-filter medium interface is nearly independent of any crossflow fluid velocity.

Dynamic microfiltration offers a number of performance advantages in the context of the present invention. Very high shear rates can be produced in the dynamic microfiltration assembly 22 so as to provide enhanced lift to repel small particles and/or to allow high permeate flow rates. Increases in permeate flux rate have been observed to be approximately linear with increased shear rate in some systems. This means that the filter area required can be dramatically reduced over other filtration means. Since shear can be delivered uniformly across the system, uniformly high flux rates can be achieved and maintained across the system such that progressive fouling is eliminated and extended filtration times can be realized. Moreover, high concentrations of agglomerated particulates can be achieved for removal from the treated fluid using dynamic microfiltration.

The dynamic microfiltration assembly 22 has the ability to handle a wide range of contaminants, to achieve an appreciably high concentration of retained solids, to be operated continuously over extended periods without the need for filter aids and/or backflushing, and to achieve uniformly high filter performance to minimize the overall system size. The dynamic microfiltration assembly 22 may be of any suitable configuration and will typically include a housing which contains a filter unit comprising one or more filter elements and a rotary unit comprising one or more members. The filter elements of the filter unit and the members of the rotary unit may have any of a variety of suitable configurations. The preferred dynamic microfiltration assembly 22 comprises an arrangement of coaxial, stacked rotary discs within a housing of interleaving filter discs, with the stacked discs and filter discs being capable of rotating relative to one another. While the rotary discs are rotating, the graywater is pumped into the housing through an appropriate inlet, and the graywater is passed through the gaps between the rotary discs and the filter discs. Part of the graywater, i.e., the permeate or filtrate, passes through the filter discs and exits the dynamic microfiltration assembly 22 for further processing, while the remainder of the graywater, i.e., the concentrate or retentate, is ultimately passed to the concentrate tank 18 or another concentrate tank for eventual disposal.

The relative rotation of the rotary discs with respect to the filter discs causes the graywater in the gaps between the rotary discs and the filter discs to sweep the surface of the filter discs. Debris is thus prevented from accumulating on the surface of the filter discs, and fouling or clogging of the filter discs is minimized, thereby extending the useful life of the filter discs.

While any suitable filter media may be used, the filter media are preferably selected such that the dynamic microfiltration assembly has an effective pore rating of about 0.02–20 $\mu$m, more preferably about 0.04–10 $\mu$m, and most preferably about 1–5 $\mu$m. Optimal filtration rates will be achieved at high shear rates, and, since shear-damage to the concentrate is not a concern in graywater treatment, maximum shear preferred, within practical equipment limitations.

The dynamic microfiltration assembly may be any suitable device. Suitable dynamic microfiltration assemblies include Pall BDF-LAB, ASEA Brown Bovery rotary CROT filter, and those microfiltration devices discussed in Murkes, "Fundamentals of Crossflow Filtration," *Separation and Purification Methods*, 19 (1), 1–29 (1990).

The dynamic microfiltration assembly 22 is connected by way of fluid pathway 23 to concentrate tank 18. The concentrated contaminants from the dynamic microfiltration assembly 22 are periodically discharged into the concentrate tank 18. Any suitable feedback means can be employed to control the dynamic microfiltration assembly 22. It is preferred that feedback controls be employed in connection with the motor mechanism of the dynamic microfiltration assembly 22 to sense the increased torque requirements associated with increased viscosity of the concentrated contaminants and to actuate control valves to automatically discharge the concentrated contaminants into the concentrate tank 18. In treating graywater, the dynamic microfiltration assembly will remove much of the particulate load. Specifically, the dynamic microfiltration assembly will remove the vast majority of the total suspended solids and will reduce the portion of the BOD and COD associated with particulates.

The filtrate from the dynamic microfiltration assembly 22 is passed by way of fluid pathway 24 to the ultrafiltration assembly 25. The ultrafiltration assembly 25 removes undesirable molecules and agglomerates, for example, those with molecular weights in the range of about 500–30,000 Daltons. The ultrafiltration process generally comprises a cross-flow filtration process inside a hollow fiber membrane. Many hollow fibers are typically bundled together into one housing, providing generally about 100 times more filter surface area per unit volume than traditional filtration systems. Most ultrafiltration membranes are porous, asymmetric, polymeric structures produced by phase inversion, i.e., the gelation or precipitation of a polymer from a soluble phase. Commonly used polymers include cellulose acetate, polyamides, polysulfones, poly(vinyl chloride-co-acrylonitrile)s, and poly(vinylidene fluoride). While any suitable filter media may be used in the ultrafiltration assembly, the ultrafiltration assembly will typically have a molecular weight cut-off of about 500 Daltons to about 30,000 Daltons, more typically about 500 Daltons to about 10,000 Daltons. The ultrafiltration assembly preferably has a molecular weight cut-off of about 3000 Daltons or less, more preferably about 1000 Daltons or less, and most preferably about 500 Daltons to about 1000 Daltons.

The partially filtered graywater flow from the dynamic microfiltration assembly 22 is split by the ultrafiltration assembly 25 into a clean water stream and a lower volume of concentrate. The concentrate can be recycled for further concentration (not shown) and/or passed by way of fluid pathway 26 into the concentrate tank 18 or another concentrate tank for disposal. Since the ultrafiltration process is improved by higher fluid velocities which tend to reduce the filter medium fouling rate, it is preferred that the ultrafiltration assembly 25 utilize a recirculation pump to take suction from the outlet end of the ultrafiltration assembly 25 and discharge it into the inlet end of the ultrafiltration cartridge assembly 25. Recirculation rates of between one and ten times the outlet flow rate are preferred, with higher recirculation flow rates being most preferred in treating heavily contaminated fluids. Two or more ultrafilters are preferably manifolded in a multiplex system to provide for switch-over to a fresh ultrafilter when one becomes fouled.

In treating graywater, the ultrafiltration assembly 25 removes many smaller organic compounds, particularly those bound up in soap micelles, which has the effect of reducing BOD and lowering pH to the extent high pH is caused by soap solutions. The ultrafiltration assembly 25 will also have the effect of nearly eliminating total suspended solids and fecal coliforms.

Any suitable ultrafiltration assembly may be utilized. Suitable ultrafiltration assemblies include the ultrafiltration cartridges Asahi VIP-3017, Amicon PM10/2000, Amicon H53P3-20, and Supelco Harp ® HF1.8 -20 -PM2.

The filtrate from the ultrafiltration assembly 25 may be essentially sterilized water depending on the precise nature and quantity of the graywater contaminants and the particular pore ratings of the dynamic microfiltration and ultrafiltration assemblies. The dynamic microfiltration assembly 22 can remove bacteria, yeast, fungi, and the like from the graywater, while the ultrafiltration assembly can reduce, if not remove, endotoxins from the graywater. While the filtrate from the ultrafiltration assembly 25 need not necessarily undergo further processing, the filtrate is preferably further treated to reduce, and preferably remove, any residual microorganisms, viruses, and organic compounds.

The filtrate from the ultrafiltration assembly 25 preferably passes through fluid pathway 27 to the ozonation system 28. The ozonation system 28 generates ozone to polish the filtered graywater. Ozone is capable of sterilizing graywater and oxidizing many organic compounds. Ozone kills microorganisms and viruses that escape the upstream filters. Such a sanitizing action typically can be effected with an ozone concentration of at least about 0.5 mg/1, preferably at least about 1 mg/1, in the water. The ozone produces no adverse side effects and quickly disappears from the processed water. Ozone can be supplied by any suitable means.

The ozonation system 28 preferably comprises a pressure swing adsorption air dryer 29, an ozone generator 30, an ozone contactor 31, a UV lamp and ozone contactor 32, and an adsorption bed 33. The ozone generator 30 may be any suitable device, e.g., a conventional device which produces ozone by accelerating electrons between two electrodes. The feed for the ozone generator 30 is either dry filtered air or oxygen. An oxygen feed produces more ozone and at a higher concentration. Concentrations typically range from 1–8 wt. %, with 2 wt.% being typical of air feed, and 3 wt.% being typical for oxygen feed.

In the case of air feed, compressed air is dried by a dual bed, pressure swing adsorption air dryer 29. Along with appropriate filters, this unit provides air of the required quality by treating air, preferably compressed air, which passes through inlet 34 to the pressure swing adsorption air dryer 29. In the case of oxygen feed, the oxygen in compressed air is concentrated by a purge sweep adsorber. Such a system is similar to that for the pressure swing adsorption air dryer 29 except for the adsorbent and cycle details. Use of an oxygen feed system requires much more air and a larger adsorption system, and, therefore, the air feed system is preferred. The pressure swing adsorption air dryer 29 is used to purify and dry the air to a low dew point, e.g., −70° F. dew point, so that the ozone generator receives filtered, very dry air to perform well and produce high concentrations of ozone over long periods.

The ozone contactor 31 provides contact time for reaction of organic residue in the filtered graywater with the ozone generated by the ozone generator 30. Ozone is generated in the gas phase and must be dissolved in the filtered graywater. Many methods of transfer or contact are available to accomplish the dissolution of the ozone in the graywater. For example, the ozone can be bubbled through a column of graywater with or without packing material. The ozone can be also injected into a pipe carrying the graywater. The transfer of the ozone into the graywater is improved by use of an in-line motionless mixer.

The graywater treatment system preferably also includes a second ozone contactor with a UV light source 32. Ultraviolet light, particularly of 254 nm, will produce hydroxyl radicals in the ozonated water, which radicals will work with the ozone in oxidizing most organic compounds. The second ozone contactor with UV light source 32 ensures that any desirable or necessary oxidation by ozone in the graywater is complete.

Residual ozone can be left to naturally decompose to oxygen, since its half-life is about 20 minutes in water at 70° F. Decomposition of the ozone can be accelerated by heating. An alternative method, which has other benefits as discussed above, is the use of UV light irradiation. An adsorption bed 33 can be also used to remove ozone. The surface provides a site for the decomposition of ozone and also can remove any remaining toxins and dissolved metal ions in the processed graywater. A mixed adsorbent provides the broadest protection. An ozone analyzer can be used to analyze the processed graywater or the vent gas to check for the complete removal of ozone from the water. The processed graywater is then passed from the treatment system through outlet 35.

The concentrate tank 18 is designed to hold the sludge from the duplex strainer 16, the dynamic microfiltration assembly 22, and the ultrafiltration cartridge assembly 25, and preferably also the macerator pump 14, for disposal at a later, convenient point in time. For example, the concentrate can be pumped out when the ship is at dock with shore facilities or barge facilities at hand or at sea outside of restricted waters.

The processed graywater can be further treated, recycled, and/or discharged as appropriate. The treatment system is preferably designed to purify the graywater to such an extent that it can be discharged into otherwise restricted receiving waters.

The efficiency of the treatment system is such that it can have a footprint no larger than about 20 ft. in length × 10 ft. in width × 10 ft. in height and still be capable of processing up to five gallons of graywater per minute shipboard, with minimal maintenance.

The following examples further illustrate the present invention, particularly the use of dynamic microfiltration and ultrafiltration to treat fluids. These examples, of course, should not be considered as in any way limiting the scope of the present invention.

EXAMPLE 1

Two 55-gallon drums of graywater were drawn from the David Taylor Research Center and the nearby Naval Academy. The origin of the graywater was believed to be 45% from showers and wash basins, 33% from galley and scullery, and 22% from the laundry. Testing was completed within 72 hours of when the sample was drawn.

The sample, as received, did not appear to include any large particles. Fifty-five gallons of the graywater was drawn though a stainless steel 24×24–0.014×0.014 mesh screen. A household garbage disposal was used to further reduce the size of any large particles. Approximately fifteen gallons of the strained water was filtered using a BDF-LAB Dynamic Microfilter (Pall Corporation). The filter element was a balanced cylinder of Pall S050-3 PSS grade H, S-series porous stainless steel, with a 5 μm absolute rating.

Half the outlet flow was concentrate, and half the outlet flow was filtrate. The filter was started using clear water to set operating parameters. The inlet was then switched to graywater, and the operating parameters were adjusted as appropriate. Flow rates were maintained constant through the test by slightly increasing the operating pressure during the course of the test. Although the filter was tested for only a short time, it was evident that the filter did not foul as quickly as a standard filter. Apparent turbidity in the filtrate was significantly lower than that of the influent, while turbidity of the concentrate was higher than that of the influent. The permeate flow rates and annulus pressures at 10 and 30 minutes into the test are set forth below.

| Time (min) | Filtrate Flow (gpm) | Annulus Pressure (psig) |
| --- | --- | --- |
| 10 | 0.091 | 6.8 |
| 30 | 0.110 | 7.5 |

About two gallons of filtrate were ozonated for 200 minutes. The ozonator used a recirculation loop with 30 feet of copper tubing. A Clean Air Corporation ozone generator, producing 8 g/hr of ozone, was used to supply ozone. An aspirator was used to introduce ozone. Turbulence at 6–8 ft/min provided the contact and mixing of the ozonated air and water.

The characteristics of the graywater at various stages of the treatment are set forth below.

| | strained | filtered | ozone (1 min) | ozone (3 min) | ozone (10 min) | ozone (30 min) | ozone (100 min) | ozone (200 min) |
| --- | --- | --- | --- | --- | --- | --- | --- | --- |
| TS (mg/l) | 1900 | | | | | | | 1700 |
| TSS (mg/l) | 26 | | | | | | | 6 |
| BOD (mg/l) | 170 | 120 | 100 | 130 | 140 | 130 | 110 | 150 |
| COD (mg/l) | 560 | 490 | 450 | 460 | 450 | 420 | 430 | 360 |
| O&G (mg/l) | <1 | | | | | | | <1 |
| FC (#/100 ml) | 1 | | | | | | | 1 |
| pH | 10.3 | | | | | | | 10.3 |
| RC (mg/l) | <0.1 | | | | | | | <0.1 |

While the total suspended solids (TSS) was not measured after filtration, it is believed that the dynamic microfiltration was solely responsible for effecting the reduction in TSS from 26 mg/l to 6 mg/l. The increase in BOD from the filtered water through ozonation was believed to be the result of ozonation converting nonbiodegradable material into biodegradable material. After 200 minutes of ozonation, the water remained foamy, indicating that soaps were not broken down. The pH remained unaffected by the dynamic microfiltration and the ozonation.

It was clear from the test that ozone was effective in reducing the COD of graywater. Although only a small amount of ozone was applied, there was an appreciable reduction in COD. Ozone was added in a concentration of 72 ppm for 200 minutes. During that time, samples were drawn from the reservoir, reducing the total volume of graywater and increasing the concentration of ozone with each new time period. At the end of the time, the concentration of ozone would have been 43 mg/1, if no ozone had been consumed through reaction. If all of the applied ozone had reacted with COD compounds, the COD should have been reduced by 43 mg/1. The COD level, however, was reduced from 490 mg/1 to 360 mg/1, a decrease of 130 mg/1. This decrease is three times more than the reduction in COD that could be attributed to the action of ozone alone.

The ozone was transferred to the water by an air stream. There was almost 3000 times more oxygen than ozone in the air. The oxygen would be effective in oxidizing those compounds that are easily oxidized, and the air flowing through the water could also strip out volatile organic compounds. These mechanisms may account for the added effectiveness of the ozonation process.

Although ozone proved effective for reducing COD, and perhaps BOD, the quantity of ozone needed to reduce COD and BOD to acceptable levels after only dynamic microfiltration would be excessive. While this test demonstrated the feasibility of dynamic microfiltration and ozonation in the treatment of graywater, this test also demonstrated the need for further filtration in addition to the dynamic microfiltration.

EXAMPLE 2

A fifty-five gallon drum of graywater was drawn from the David Taylor Research Center and filtered through a series of filters characterized by decreasing pore size. The first filter was a knit mesh screen which simulated a duplex strainer. The second and third filters simulated the filtration of the dynamic microfiltration assembly. The second filter was an Ultipor®GF 3 $\mu$m absolute filter (Pall Corporation), while the third filter was a Sanitary Filter with a nylon membrane and a 0.04 $\mu$m absolute rating (Pall Corporation). The fourth filter was an Ultrafilter® model VIP-3017 (Asahi), with a cut-off molecular weight of 6000 Daltons, and simulated the ultrafiltration assembly.

The ultrafilter was rinsed with 3 $\mu$m absolute deionized water for approximately 20 hours and then drained prior to testing. The drum of graywater was pressurized to approximately 5 psig with air, which forced the graywater through the filters at a total flow rate of less than 0.5 gpm. The concentrate flow rate from the ultrafilter was approximately one-fourth that of the filtrate (purified water) flow rate. Samples of the filtrate were taken at three different locations on the test system: (i) downstream of the screen filter, (ii) downstream of the two filters simulating dynamic microfiltration, and (iii) from the ultrafilter. The filtrate was allowed to flow from the first two sample taps for 30 seconds before the samples were taken, and the ultrafilter was flushed with process fluid for ten minutes prior to collecting samples.

The filtration system definitely improved the clarity of the graywater, and the odor and foaming of the graywater were also reduced. The flow rate gradually dropped through the test while a constant pressure was maintained in the drum. Examination of the system indicated that either the second or third filter, or both, were becoming plugged. The use of an actual dynamic microfiltration assembly will preclude such plugging. Examination of the concentrate in the housing of the second filter revealed that it was much darker than the original graywater fluid. The test results are set forth below.

|  | strained | microfiltered | ultrafiltered |
|---|---|---|---|
| TS (mg/l) | 1100 | 980 | 580 |
| TSS (mg/l) | 26 | 2 | 1 |
| BOD (mg/l) | 220 | 74 | 47 |
| COD (mg/l) | 540 | 210 | 120 |
| O&G (mg/l) | 110 | 9 | 1 |
| FC (#/100 ml) | 19 | <1 | <1 |
| pH | 10.1 | 10.1 | 9.9 |

The test results indicate that the combination of dynamic microfiltration and ultrafiltration can meet total suspended solids and fecal coliform requirements, while the addition of acid feed may be required to correct the strongly alkaline condition. The use of a coagulant upstream would enhance the filtration effect achieved by the dynamic microfiltration. The test results also indicate that ozone and UV light irradiation would be useful to further reduce the BOD level.

All of the references cited herein are hereby incorporated in their entirety by reference.

While this invention has been described with an emphasis upon a preferred embodiment, it will be obvious to those of ordinary skill in the art that variations in the preferred method and apparatus may be used and that it is intended that the invention may be practiced otherwise than as specifically described herein. Accordingly, this invention includes all modifications encompassed within the spirit and scope of the invention as defined by the following claims.

What is claimed is:

1. A method of treating particulate-containing wastewater comprising passing wastewater into a dynamic microfiltration assembly to form a first concentrate stream and a filtrate stream and then passing said filtrate steam into an ultrafiltration assembly to form a second concentrate stream and a purified water stream, wherein said dynamic microfiltration assembly comprises a filter medium and means to effect relative movement between said filter medium and said wastewater such that the shear at the wastewater-filter medium interface is nearly independent of any crossflow fluid velocity, and wherein said wastewater comprises graywater from ships.

2. The method of claim 1, wherein said dynamic microfiltration assembly has an effective pore rating of about 0.02 $\mu$m to about 20 $\mu$m.

3. The method of claim 2, wherein said ultrafiltration assembly has a molecular weight cut-off of about 500 Daltons to about 30000 Daltons.

4. The method of claim 3, wherein said dynamic microfiltration assembly has an effective pore rating of about 0.02 $\mu$m to about 10 $\mu$m, and said ultrafiltration assembly has a molecular weight cut-off of about 500 Daltons to about 10000 Daltons.

5. The method of claim 4, wherein said wastewater passes through a strainer prior to passing said wastewater to said dynamic microfiltration assembly.

6. The method of claim 5, wherein said strainer is effective in removing particles larger than about 90 $\mu$m to about 500 $\mu$m diameter.

7. The method of claim 6, wherein said strained wastewater is contacted with a compound selected from the group consisting of acids, coagulants, and mixtures thereof prior to being passed to said dynamic microfiltration assembly.

8. The method of claim 7, wherein said purified water stream is contacted with ozone.

9. The method of claim 8, wherein the concentration of said ozone in said purified water stream is at least about 0.5 mg/l.

10. The method of claim 9, wherein said purified water stream is subjected to ultraviolet light irradiation.

11. The method of claim 10, wherein said purified water stream is passed through an adsorption bed.

12. The method of claim 11, wherein said first and second concentrate streams are passed to a concentrate tank.

13. The method of claim 12, wherein said wastewater is passed into a holding tank and then pumped from said holding tank to said strainer.

14. The method of claim 13, wherein said holding tank permits high density pieces entrained in said wastewater to settle out on the bottom of said holding tank.

15. The method of claim 14, wherein said wastewater pumped from said holding tank is subjected to action which reduces the size of particulates in said wastewater.

16. The method of claim 15, wherein said wastewater is screened prior to being subjected to action which reduces the size of particulates in said wastewater.

17. The method of claim 1, wherein said graywater comprises about 259–11,700 mg/l total solids, about 101–4,695 mg/l total suspended solids, about 137–2,616 mg/l BOD, about 304–7,839 mg/l COD, about 5–1210 mg/l oils and greases, and about 0–10$^4$ fecal coliforms/100 ml.

18. The method of claim 17, wherein said graywater has a pH of about 5.7–11.2.

19. The method of claim 18, wherein said graywater has about 0–10 mg/l residual chlorine.

20. The method of claim 19, wherein said graywater has about 0 mg/l dissolved oxygen.

21. The method of claim 1, wherein said purified water stream has less than about 30–11,600 mg/l total solids, less than about 30 mg/l total suspended solids, less than about 30 mg/l BOD, less than about 90 mg/l COD, less than about 15 mg/l oils and greases, and less than about 14 fecal coliforms/100 ml.

22. The method of claim 21, wherein said purified water stream has less than about 0.0002 mg/l residual chlorine.

23. The method of claim 22, wherein said purified water stream has more than about 5 mg/l dissolved oxygen.

24. The method of claim 23, wherein said purified water stream has a pH of about 6.5 to about 8.5.

25. An apparatus for treating wastewater comprising:
   (a) a holding tank having an inlet and an outlet, wherein said outlet is located above the bottom of said holding tank to permit high density pieces entrained in said wastewater to settle out on the bottom of said holding tank,
   (b) a macerator pump capable of drawing said wastewater from said holding tank and reducing solid materials entrained in said wastewater to smaller particles,
   (c) a strainer capable of straining particles which would adversely affect microfiltration from said wastewater,
   (d) a chemical feed system for feeding into said wastewater chemicals selected from the group consisting of acids, coagulants, and mixtures thereof,
   (e) a dynamic microfiltration assembly capable of splitting said wastewater into concentrate and microfiltered permeate,
   (f) an ultrafiltration assembly capable of splitting said microfiltered permeate into concentrate and ultrafiltered permeate,
   (g) an ozone contactor,
   (h) a ultraviolet light irradiation, contactor,
   (i) an adsorption bed, and
   (j) a concentrate tank for receiving concentrate from said dynamic microfiltration assembly and said ultrafiltration assembly.

* * * * *